United States Patent [19]
Olson et al.

[11] 3,992,708
[45] Nov. 16, 1976

[54] OPTICAL TRACKING ANALOG FLYWHEEL

[75] Inventors: Larry Ray Olson; J. Max Massey, Jr., both of King George, Va.

[73] Assignee: The United States of America as represented by the Secretary of the Navy, Washington, D.C.

[22] Filed: July 18, 1975

[21] Appl. No.: 597,252

[52] U.S. Cl. ............................................. 343/6 R
[51] Int. Cl.² ........................................... G01S 9/02
[58] Field of Search ............... 343/6 R, 6 ND, 6 TV

[56] References Cited
UNITED STATES PATENTS

| | | |
|---|---|---|
| 3,242,485 | 3/1966 | Astheimer ...................... 343/6 ND |
| 3,300,777 | 1/1967 | Tarr ................................ 343/6 ND |
| 3,320,420 | 5/1967 | Paglee et al. ................ 343/6 ND X |
| 3,427,611 | 2/1969 | Enenstein ........................... 343/6 R |
| 3,714,898 | 2/1973 | Ziemba .......................... 343/6 R X |
| 3,754,249 | 8/1973 | Kearney ............................ 343/6 R |
| 3,798,795 | 3/1974 | Michelsen .................. 343/6 TV X |

*Primary Examiner*—T.H. Tubbesing

[57] ABSTRACT

An optical tracking system wherein an analog computer program is operated simultaneously with a real projectile firing. The program is forced to match its output of projectile position with real-time data. When no data is available, the analog program acts as a very sophisticated flywheel to keep optical tracking mounts continuously positioned very closely to the actual target position until it can be reacquired.

4 Claims, 1 Drawing Figure

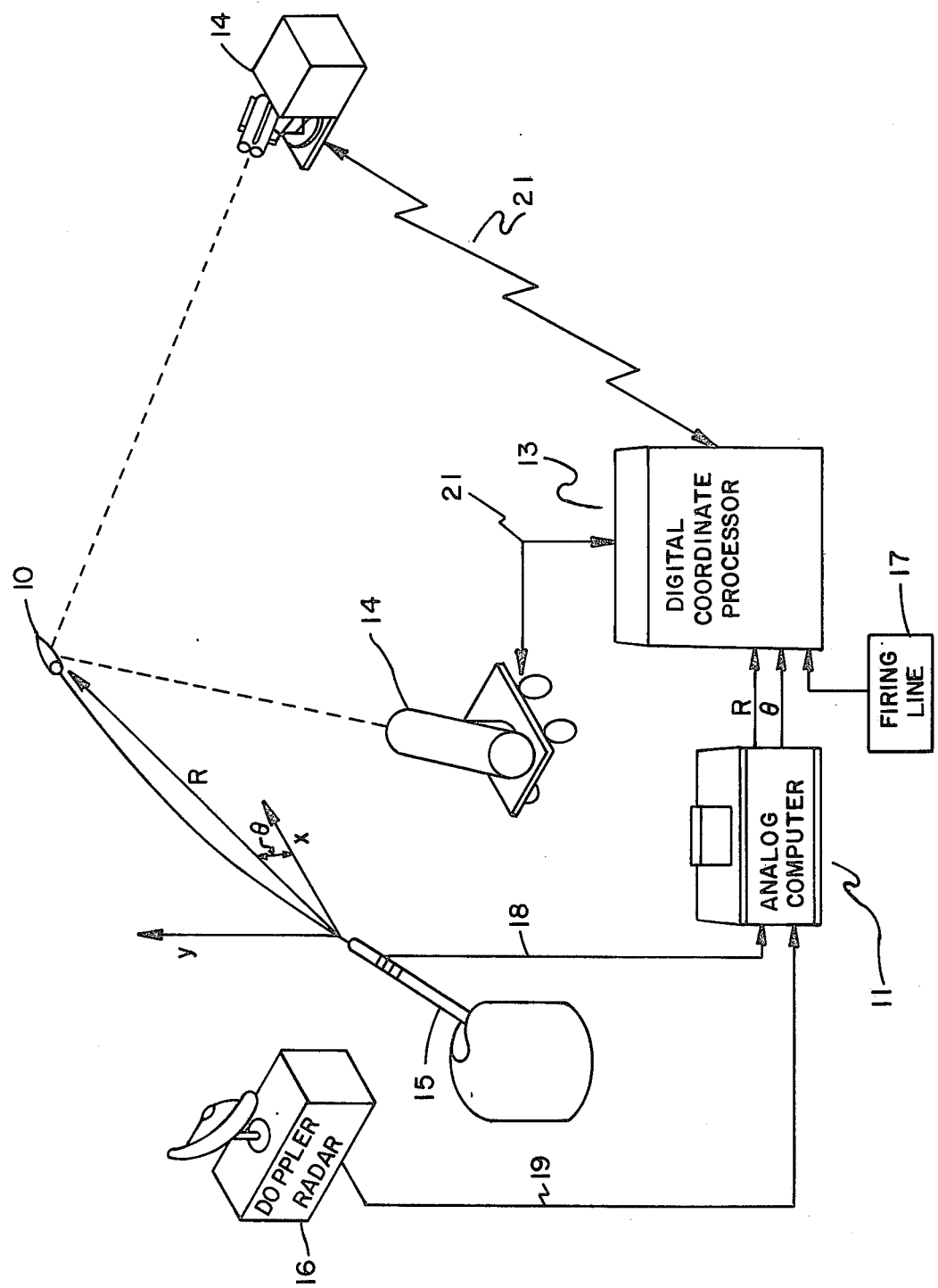

OPTICAL TRACKING ANALOG FLYWHEEL

BACKGROUND OF THE INVENTION

A high speed projectile can come out of the muzzle of a gun moving at a speed of more than 3000 feet per second (three times faster than the speed of sound). As it flies, it may merely spin in a stabilized orientation or it may execute a number of critically timed functions such as deploying stabilizer fins, discarding a nose cone, lighting a rocket motor, distributing chaff or exploding a warhead. If it is ill-designed, it may fail to perform up to par or even tumble out of control.

New sophisticated projectiles range in size from 16 inches in diameter down to small caliber arms. Over the years specialized techniques allowed high speed movies or closeup still photographs of the projectile to be taken near the muzzle with stationary cameras. However, until recently, the need to photograph and track the position of projectiles throughout the trajectory had not been satisfied.

Tracking cameras need to be located at various range stations and at the gun site to photograph and track the projectile from good vantage points as it moves down the firing range. Some tracking cameras may not be able to view the gun from down range, and, for even those that can, the projectile quickly passes through their field of view before the tracking mount can reach slewing speed. Without outside assistance, projectile acquisition is improbable. Projectiles have been manually acquired and tracked by a telephoto lens mounted on a tracking mount located directly behind the gun and pointed to intercept the trajectory of the projectile at a grazing angle. But, often, the projectile is lost in haze or clouds with no hope for reacquisition on the down hill side of the trajectory.

SUMMARY OF THE INVENTION

The optical tracking system, of which the analog flywheel is a part, includes optical trackers located along the target flightpath. By communication links, each tracker is connected to a digital coordinate processor which selects one of the optical trackers as master and slaves the others to that one. The coordinate processer normally selects as master the most down-range tracker which has acquired the target. As a target passes down the tracking range, the trackers sequentially acquire the target, slave the next tracker onto the target, and then lose track. Each optical tracker may contain a range only radar so that when it has acquired the target, it provides unique position data which describes the target location in terms of azimuth, elevation, and slant range with respect to the tracker. Prior to incorporation of the analog flywheel, there was no alternative for initial acquisition than to locate a tracker directly behind the gun or launcher. In many cases, because of physical or safety restrictions, such a location is undesirable. Down range trackers were entirely dependent on the tracker behind the gun or launcher to successfully acquire and provide azimuth, elevation and slant range data. In no way does the addition of the analog flywheel negate or interfere with this means of acquisition and tracking. However, it does relieve the constraint of having to have a tracker behind the gun and of having to have ranging radar associated with the tracker. Furthermore, the analog flywheel provides a means of reacquiring when the target reappears after having been lost in haze or clouds.

Another advantage is the ability of the flywheel to position the tracker to the general location of the target and to make only fine corrections in the motions of the tracker. Without the flywheel, it is necessary for tracking personnel to control all the motion of the tracker which causes degradation in the tracking sensitivity and increases the likelihood of target loss.

STATEMENT OF THE OBJECTS OF INVENTION

An object of this invention is to photograph and track the position of a projectile throughout its trajectory.

An object of this invention is to optically reacquire a target which was lost in clouds or haze and subsequently became visible.

Another object of this invention is to optically acquire a target without having to locate a tracker directly behind a gun or launcher.

Other objects, advantages and novel features of the invention will become apparent from the following detailed description of the invention when considered in conjunction with the accompanying drawings.

BRIEF DESCRIPTION OF THE DRAWINGS

The sole FIGURE is a block diagram of the optical tracking system.

DETAILED DESCRIPTION OF THE INVENTION

Referring to the FIGURE, the optical tracking system simulates the trajectory of the projectile 10 with the analog computer 11, provides slant range R and angular elevation $\theta$ of the projectile to a digital coordinate converter 13, and the converter 13, in turn, directs each tracking mount 14 in azimuth and elevation to the projectile location.

Each tracking mount 14 can be equipped with a variety of cameras and telephoto optics with, for example, 400 inch focal length. By having range only radar on each tracking mount, the cameras can be automatically focused.

Although many possibilities exist for the analog computer program, the one used in the preferred embodiment utilizes a number of basic equations of motion used to describe projectiles. These are:

$$m\ddot{x} = -F_D \cos \theta_w$$

$$m\ddot{y} = -F_D \sin \theta_w - mg$$

$$\dot{X}_w = \dot{X} + W_x$$

$$V_s = 340.3 \sqrt{\frac{T + 273.16}{288.16}} - 4 \times 10^{-3} Y$$

$$M = V_w/V_s$$

$$p = p_0 \, e^{-y/10,000}$$

$$V_w = \sqrt{(\dot{x}+w_x)^2 + (\dot{y})^2}$$

$$\cos \theta_w = \dot{X}_w/V_w$$

$$\sin \theta_w = \dot{Y}/V_w$$

$$F_D = f C_{D_0} S \, \frac{p}{2} (V_w)^2$$

where, unless otherwise specified, all dimensional units in the above equations are in the MKS system and, where:

- $m$ = mass
- $\ddot{X}$ = X component of acceleration
- $F_D$ = drag force
- $\theta_w$ = the angle between the wind corrected $\dot{X}$ vector and the total velocity $V_w$
- $g$ = acceleration due to gravity
- $\dot{X}_w$ = X component of velocity plus the wind velocity in the X direction
- $\dot{X}$ = X component of velocity
- $W_r$ = the wind velocity in the X direction where $W_r > 0$ denotes a headwind
- $V_s$ = the speed of sound in meters/second
- $T$ = surface temperature in degrees centigrade
- $Y$ = altitude
- $M$ = the velocity of the projectile in Mach number notation
- $p$ = atmospheric density at altitude Y
- $p_o$ = standard atmospheric density
- $V_w$ = the total projectile velocity including wind $(=\dot{X}+W_r+\dot{y})$
- $\dot{y}$ = the y component of projectile velocity
- $f$ = form factor for the drag curve
- $s$ = cross sectional area of the projectile
- $C_{D_o}$ = drag coefficient (at a given velocity)

The speed of sound $V_s$ which is used for calculating MACH number is assumed to vary linearly with altitude and depend on the surface temperature T. The atmospheric density $p$ is assumed to be exponentially decreasing with altitude Y. The surface density, $p_o$, is adjusted up or down to reflect the true atmosphere. This fictional surface density is calculated in terms of the actual atmospheric density versus altitude with pre-calculated weighting factors. This derived surface density is called the ballistic density and has the result of making the calculated impact point (using the idealized, exponential atmosphere model) match the impact point which one would calculate using the actual density function. Although the impact points are matched by this process, other points along the trajectory would not, in general, exactly match-up. The wind is handled similarly to derive a single number representing headwind or tail wind called the ballistic wind. Cross wind components are neglected in the above equations as the math model is two-dimensional, assuming the gun fires directly down the X axis and with the Y axis as altitude. However, a three dimensional system is feasible to accomodate drift due to cross winds and projectile spin. Through the use of ballistic wind and ballistic density, the math model is tractable for an analog computer and yet retains a high element of realism. The drag coefficient is determined by wind tunnel tests and is implemented in the computer by dividing the drag curve into linear segments. Drag function shapes vary considerably from one projectile design to another depending, for example, on whether or not the projectile has stabilizing fins.

Before a projectile firing, the firing line information 17 is set into the digital processor. This information includes the positions of the gun and of the optical trackers and the line of fire that the gun is firing down.

At the time of firing, the analog computer 11 is started by the muzzle exit signal 18. The analog computer begins calculating the projectile position using an estimated value for the muzzle velocity. When a doppler radar 16 is used, after the projectile has moved into the field of view of the radar 16 and is locked onto the projectile, about 0.5 seconds after muzzle exit, the actual projectile velocity 19 is injected into the analog computer 11. The doppler radar 16 is located directly behind or beside the gun or launcher. The doppler frequency is shaped, digitized and transmitted to the analog computer 11 as a TTL square wave frequency. A phase locked loop is used to convert the frequency to a voltage proportional to the projectile velocity. Once the computer program is updated with the measured velocity, the program returns to computing further changes in velocity.

As the projectile continues on its trajectory, critical events such as rocket motor ignition or burnout, shroud deployment, or other functions which could affect the trajectory can be transmitted to the computer. These events, therefore, can signal options within the simulation to maintain high accuracy tracking. The analog computer lends itself to this type of updating and is a primary basis for selecting analog over digital methods.

After the velocity is updated by the doppler radar, the computer simulation gives real time trajectory data, which, over a 60 second period, agrees with actual target position with accuracies on the order of ±150 feet. The information from the analog program is digitized, formatted, and put into a digital coordinate processor 13 in the form of an elevation angle $\theta$ and range R from the gun to the projectile, (an assumption is made that the projectile flies down the line of fire).

Through a telemetry link 21, the digital processor 13 aims the optical trackers 14 at the point in space where the analog computer 11 calculates that the projectile 10 is located.

Although the optical trackers 14 are slaved to the analog computer 11, full manual control of the tracker 14 can be assumed by the tracker operator once the projectile is sighted. If the operator loses the projectile after acquiring it, the tracker can go back to being slaved to the analog computer until the projectile is reacquired.

Obviously many modifications and variations of the present invention are possible in the light of the above teachings. It is therefore to be understood that within the scope of the appended claims the invention may be practiced otherwise than as specifically described.

What is claimed is:
1. An optical tracking system which acquires and maintains track on gun-fired projectiles or rocket targets comprising:
   a target;
   means to launch said target;
   an analog computer for continuously simulating the trajectory of said target and for continuously generating signals representative of the real time position of said target along its trajectory, said analog computer operatively connected to said launching means whereby the simulation is begun at launch;
   a digital coordinate processor electrically connected to the output of said analog computer wherein the output signals of said analog are analyzed in accordance with stored data and a signal representative of target position is generated;
   at least one tracking mount; and
   a telemetry link responsive to the output of said digital coordinate processor, slaving each of said tracking mounts to said analog computer.
2. The tracking system of claim 1 including:

a doppler radar electrically connected to said analog computer and injecting therein the actual target velocity after said target has been launched.

3. A method for optically tracking a gun-fired projectile or rocket target comprising:
firing a target;
simulating in real time the trajectory of said target upon firing, based upon an estimated initial velocity;
determining from the simulation the position coordinates of said target during flight;
communicating the position coordinates to optical tracking stations; and
optically tracking said target.

4. The method of claim 3 including the additional steps of:
determining the actual velocity of said target; and
correcting said simulation to reflect the actual velocity of said target.

* * * * *